United States Patent [19]

Kelterborn et al.

[11] Patent Number: 4,539,097
[45] Date of Patent: Sep. 3, 1985

[54] METHOD FOR FILTERING SOLVENT AND TAR SAND MIXTURES

[75] Inventors: Jeffrey C. Kelterborn, Hinsdale; Richard A. Stone, Yorkville, both of Ill.

[73] Assignee: Standard Oil Company (Indiana), Chicago, Ill.

[21] Appl. No.: 584,718

[22] Filed: Feb. 29, 1984

[51] Int. Cl.³ .............................................. C10G 1/04
[52] U.S. Cl. ............................ 208/11 LE; 208/8 LE; 210/193; 210/777
[58] Field of Search ............ 208/11 LE, 8 LE, 11 R; 210/400, 401, 193, 777

[56] References Cited
U.S. PATENT DOCUMENTS
4,448,667 5/1984 Karnofsky ........................ 208/11 LE Primary Examiner—D. E. Gantz
Assistant Examiner—A. Pal
Attorney, Agent, or Firm—William E. Murray; William T. McClain; William H. Magidson

[57] ABSTRACT

A method for filtering spent tar sands from a bitumen and organic solvent solution comprises separating the solution into two streams wherein the bulk of the coarser spent tar sand is in a first stream and has an average particle size of about 10 to about 100 mesh and the bulk of the finer spent tar sand is in a second stream; producing a filter cake by filtering the coarser spent tar sand from the first stream; and filtering the finer spent tar sand from the second stream with the filter cake. The method is particularly useful for filtering solutions of bitumen extracted from bitumen containing diatomite, spent diatomite and organic solvent.

20 Claims, 1 Drawing Figure

METHOD FOR FILTERING SOLVENT AND TAR SAND MIXTURES

This invention relates generally to methods for solvent extraction of bitumen from bitumen containing tar sands and more particularly to an improved method for filtering spent tar sands from bitumen solvent mixtures.

BACKGROUND OF THE INVENTION

Large deposits of bitumen containing tar sands are found in various locations throughout the world. In addition, large deposits of bitumen containing diatomite wherein the bitumen is deposited on predominantly diatomaceous material also exist. As used herein, the term tar sands includes both bitumen containing tar sands and bitumen containing diatomite. The bitumen contained in tar sands is a mixture of hydrocarbons and the bitumen content of tar sands varies over a wide range.

Because of bitumen's hydrocarbon nature, solvent extraction of tar sands is an attractive method for recovery of the crude petroleum. However, spent tar sand must be separated from admixture or suspension in the solvent and dissolved bitumen prior to solvent removal and eventual bitumen recovery. As used herein, such an admixture or suspension containing spent sand is referred to as a solution. Substantially complete separation of spent tar sands is important because for refinery processing the bitumen preferably contains less than about 1.0 weight % solids to avoid catalyst plugging.

The main technical problem in spent sand separation is due to generation of many fine sand particles sized less than 400 mesh during mining and crushing of raw tar sands in preparation for solvent extraction. As used herein, the terms "fine particles" or "fines" mean particles smaller than 400 mesh and all mesh sizes are American Standard sizes. These fine particles interfere with filtration of the solvent bitumen solution because the fines blind the filters. This problem is very acute with bitumen containing diatomite since the diatomite particles are very friable. Thus, crushed diatomite typically can have up to 30 weight % fines.

U.S. Pat. No. 4,240,897, Clarke, "Oil Sands Hot Water Extraction Process", issued Dec. 23, 1980, discloses treating tar sands with hot water and then separating in a primary separation unit a froth which contains bitumen, water and mineral matter, a middlings stream, which is sent to a secondary separation unit for bitumen recovery, and a wet tailings stream. A tailings stream from a froth clean-up unit, which processes the froth from both the primary and secondary recovery units, a tailings stream from the secondary recovery unit, and the wet tailings stream are sent to a filter unit. The wet tailing stream is filtered to form a tailings cake and the tailings stream from the froth clean-up and secondary recovery unit are filtered through the dried cake. To aid filtration of "fines" mineral matter contained in the tailings streams, it is disclosed a flocculant can be added. Clarke is not directed to extraction of bitumen from tar sands with an organic solvent, and does not address the problem of filtering high fines content solutions resulting from extraction of bitumen-containing diatomite with an organic solvent. Further, the streams filtered through the filter cake do not contain bitumen, and are thus more easily filtered. Clarke also does not disclose the average particle size of tailings or the filter cake depth needed to make an operable filter cake.

It is a general object of this invention to provide an improved filtration method for filtering spent tar sands from a bitumen organic solvent solution. Another object is to filter high fines diatomite solutions. Still another object is to provide an improved process for solvent extraction of bitumen from tar sands. Another object is to provide a process for providing bitumen having a solids content which can be refinery processed. Other objects appear below.

SUMMARY OF THE INVENTION

The invention comprises a method for filtering spent tar sands from a solution of bitumen, spent tar sands and organic solvent comprising: separating a solution of bitumen, spent tar sands and organic solvent into a first stream comprising coarser spent tar sands having an average particle size of about 1 to about 100 mesh, bitumen, and solvent, and a second stream comprising finer spent tar sands, bitumen, and solvent; filtering the coarser spent tar sands from the first stream to produce a filter cake; and filtering finer spent tar sands from the second stream through the filter cake. Use of this filtration technique in organic solvent extraction of bitumen produces a bitumen extract of low solids content capable of processing in a refinery.

DETAILED DESCRIPTION OF THE INVENTION

Figure 1:
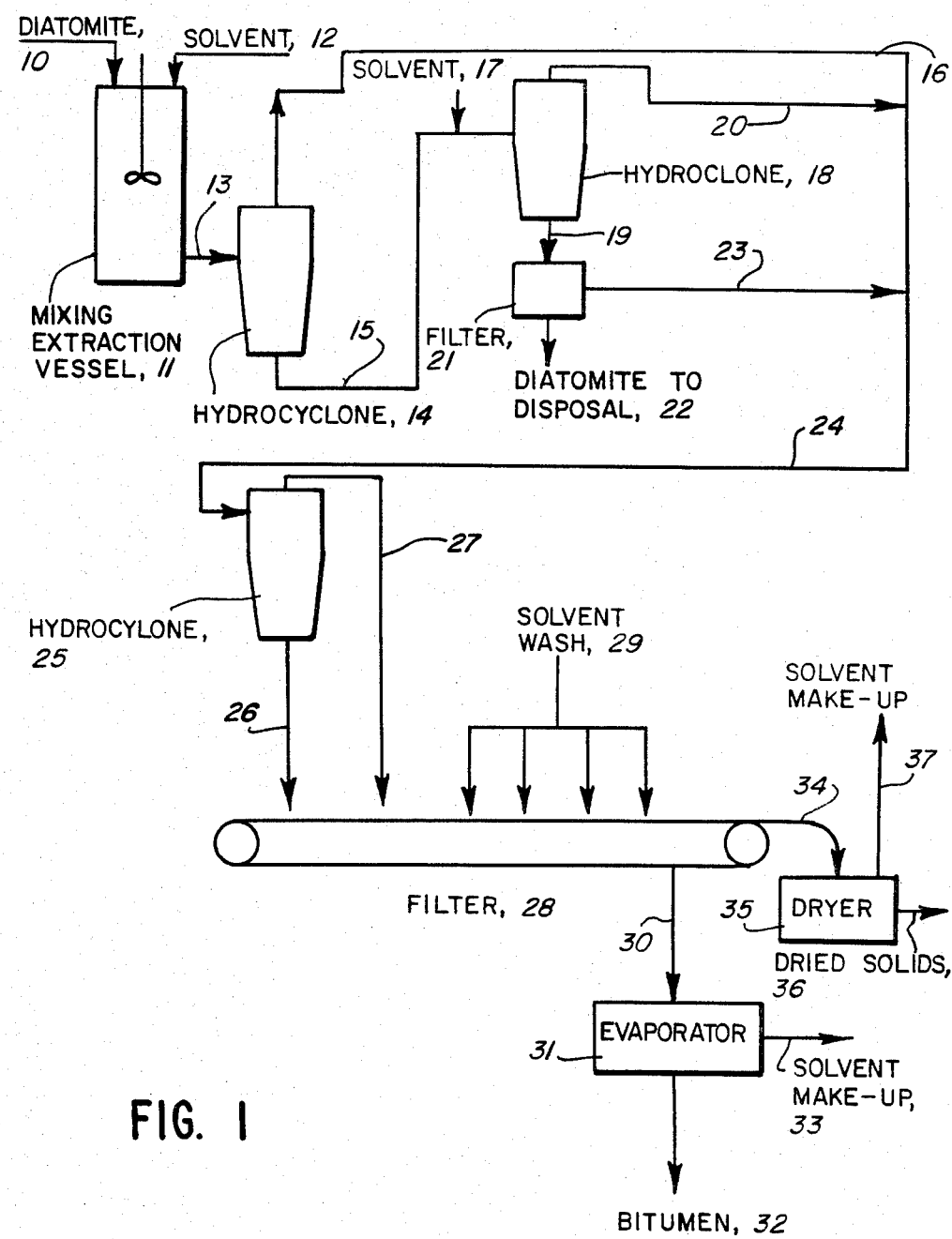
FIG. 1 is a flow diagram of the solvent extraction method of the invention.

The invention broadly comprises a method for treating a solution comprising tar sand, bitumen and organic solvent to remove spent tar sands and has particular utility in the extraction and separation of a bitumen concentrate from tar sands which can be processed directly in a refinery. The invention comprises separating a bitumen, organic solvent and spent tar sands solution into two streams: a first stream comprising bitumen, solvent and coarser spend tar sands having an average particle size of about 10 to about 100 mesh; and a second stream comprising bitumen, solvent and finer spent tar sands. The first stream containing the coarser spent tar sands is then filtered, for example, through a vacuum belt filter, to produce a filter cake, and the second stream comprising the finer spent tar sands is filtered through the filter cake. The thus filtered first and second streams of low fines content are combined and further processed to remove solvent and separate a bitumen concentrate of low fines content.

The invention has the advantage of processing organic solvent bitumen solutions, such as those from extraction of bitumen containing diatomite, containing high fines content which ordinarily cannot be handled by filtration methods. The invention has the further advantage, when compared to deasphaltening methods of fines removal from bitumen solvent solutions, of higher bitumen yield because a portion of the asphaltenes in the bitumen is not separated during fines removal. Another advantage is that splitting into two streams is done rapidly and continuously in a hydrocyclone, thus yielding a fast processing of tar sands. Still another advantage is that streams containing bitumen are filtered before bitumen removal. The invention also has the advantage that careful mining and crushing of raw tar sands to reduce the amount of fines generated is unnecessary. A further advantage is that very little water is required in the overall extraction making the invention well suited for operation in regions with minimal water supply.

In one embodiment of the invention, a post-extraction solution of spent diatomite comprising greater than 15 weight % fines, bitumen and organic solvent are filtered to produce the low fines content bitumen solution. In another embodiment, the spent sand containing solution is first processed to remove coarse spent sand particles, larger than the coarsest size appropriate for the filter cake, about 10 mesh, which can interfere with filtration through the cake. For example, as in FIG. 1, spent sand larger than 10 mesh is removed before the splitting into two streams in the hydrocyclone and production of the filter cake.

Bitumen-containing tar sands processed according to the invention can be those mined from any bitumen containing deposit including diatomite deposits such as found in California, tar sands having water envelopes around the sand particles such as found in Athabasca, Canada, and tar sands having a negligible connate water content such as found in Utah. The invention is particularly suitable for processing bitumen containing diatomite. The bitumen is generally about 3 to about 30 weight percent of the raw tar sands, but can be higher, and is a mixture of hydrocarbons, which can include straight chain and heterocyclic compounds. The tar sands are reduced preferably to less than about ½ inch top size before solvent extraction.

The organic solvent can be any hydrocarbon capable of extracting at least a portion of the bitumen from tar sands. Preferably, the solvent is one which dissolves substantially all the bitumen content of the tar sands and which has low viscosity to raise the filtration rate. Suitable solvents include hydrocarbons of carbon number 1 through 15 unsubstituted or substituted by at least one nitrogen, oxygen, halogen, or sulfur atom. Typical such solvents include toluene, chlorinated solvents such as chloroform and methylene chloride, and paraffins of carbon number 5-9 such as heptane. A preferred solvent is heptane because of its low viscosity and effectiveness in extracting substantially all of the bitumen.

The apparatus used in the invention is discussed in greater detail in conjunction with the preferred embodiment in FIG. 1. Bitumen containing diatomite 10 which have been mined and crushed to about ½ inch top size in any convenient manner enter mixing extraction vessel 11, which is any tank or vessel suitable for mixing tar sands with solvent. The diatomite is contacted and mixed with solvent 12 for a time and at a temperature sufficient to dissolve most of the bitumen, preferably about ½ hour at a temperature of about 150° F. After mixing, the resulting slurry 13 comprises spent diatomite, dissolved bitumen and organic solvent. The spent diatomite include coarser and finer particles and are those from which at least a portion and preferably all of the original bitumen has been removed. The dissolved bitumen content of the slurry 13 is preferably above about 10 weight %.

The slurry 13 enters hydrocyclone 14 for removal of coarse spent diatomite which can interfere with filtration through the filter cake. Preferably the cyclone removes substantially all diatomite larger than 10 mesh in underflow 15. Fresh solvent 17 is added to wash the removed diatomite in stream 15 before entering hydrocyclone 18. Here, the washed diatomite is removed in underflow 19 and goes to filter 21 which can be any suitable filter. Filtered diatomite 22 goes to disposal and recovered solvent 23 is combined with overflow streams 16 and 20 as stream 24. Stream 24 thus comprises the slurry of spent diatomite, substantially all of which is smaller than 10 mesh, bitumen and solvent, and is ready for splitting.

Stream 24 enters hydrocyclone separating device 25 for splitting the slurry into two streams. The separating device is preferably a hydrocyclone of a size suited to amounts of slurry processed. For example, a 10 inch hydrocyclone can be used to process about 368 gallons per minute of a 50 weight % solids slurry. Other separating devices can be used but hydrocyclones are preferred because they are capable of fast, continuous processing of large volumes of slurry and of splitting the slurry into streams containing the desired spent diatomite (or tar sands) size.

The hydrocyclone 25 splits the bitumen, spent diatomite and solvent slurry into two streams. The first stream 26 comprises bitumen, solvent and coarser spent diatomite and is the underflow, or heavier stream, from the hydrocyclone. In general, the average particle size of the particles in stream 26 which are used to make up the filter cake is the smallest size which permit filtration without blinding. Applicants prefer an average particle size of about 10 mesh to about 100 mesh particles to make the cake because such a cake permits filtration without blinding, even where filtering streams containing greater than 15% fines. As used herein, average particle size means that the distribution of particle sizes is such that 50% of the particles in a stream are larger than this size. Stream 26 also preferably contains less than about 5% of fines because greater percentages of fines can blind the filter. Where pre-cake stream 26 contains greater than 5% fines, de-sliming steps, such as by slurrying the stream with a fresh which does not precipitate the asphaltenes content of the bitumen, and decanting the resulting suspension of solvent and fines, can be taken before making the cake. The hydrocyclone is therefore operated so that particles smaller than 10 to 100 mesh are not a substantial amount in stream 26 to ensure an adequate filter cake.

To assist in achieving the preferred average particle size, the hydrocyclone is operated preferably at high solids loadings, greater than about 50%, because this results in a "rope discharge" underflow wherein the proportion of fines is minimized to less than about 5%. The overflow stream 27 comprises bitumen, solvent and finer spent sand particles, is the remainder stream from the hydrocyclone, and is preferably such that about 95 wt% of spent sand particles are smaller than 100 mesh. The average particle size of the overflow is generally smaller than about 100 mesh.

The particle size used to make the cake and the cake depth vary with the type of tar sands extracted. When filtering either spent tar sands which originally contained water envelopes or spent diatomite, the filter cake is preferably made substantially of particles having an average particle size of about 10 to about 100 mesh and the filter cake depth is at least about 1 to about 2 inches to ensure filtration without vacuum requirements greater than 25 inches of mercury. However, when filtering spent tar sands originally without water envelopes, i.e., those containing negligible connate water, it is believed that particles having an average particle size larger than about 50 mesh are used to make a cake at least 2 inches deep to ensure filtration without blinding.

With negligible connate water spent sands, a greater applied vacuum can also be necessary. In any filtration if desired, additional particles, which can be different than the spent particles filtered, of an appropriate size can be added to stream 26 before forming the cake, and this can be particularly useful with sands of negligible connate water.

The first stream 26 is filtered through a vacuum belt filter 28, preferably one designated as medium fast, to produce the filter cake of coarse spent diatomite particles. The vacuum belt filter is preferred because it allows continuous processing and easier control of the cake depth, but other filters such as a batch filter press can be used. For belt filters the filtration rate is preferably above 10 lb. dry solids/hr/ft² of filter face. In some cases, it can be desirable to precoat the filter before making the filter cake. The filter operates preferably with a vacuum pressure below about 25 inches of mercury.

The second stream 27 containing the finer diatomite is filtered through the filter cake deposited on the vacuum belt filter. To ensure continuous operation it may be necessary to temporarily store stream 27 in a holding tank to permit build-up of the filter cake to the desired depth on the belt filter. Near the discharge end of the belt, the filtered solids 34, which include the filter cake, are washed with additional solvent 29. The solvent wash and the first and second stream filtrates are combined as stream 30 which goes to evaporator 31 where solvent 33 is removed and the bitumen 32 is recovered. The filtered solids 34 are sent to dryer 35. Recovered solvent 37 is reused and the dried solids 36 are sent for disposal.

It should be noted that both stream 26 and stream 28 contain bitumen and are filtered before bitumen removal. This is a major advantage because the presence of bitumen ordinarily makes filtration difficult due to filter blinding, which is believed caused by bitumen's viscosity combined with the presence of solids. The separation into two streams having the respective average particle size of the invention permits filtration of streams containing greater than about 10 weight % bitumen.

The following example shows the ability of the invention to produce a bitumen solvent solution of low fines content and hence a bitumen concentrate of low fines content. Thirty weight % of diatomite containing about 20 weight % bitumen from the Mckittrick deposit in California was mixed with 70 weight % n-heptane. The slurry was then circulated through a pump for about 15 minutes to break up spent diatomite aggregates and sent to a 4″ hydrocyclone. The feed to the cyclone contained 27 weight % solids.

A sample of the underflow containing approximately 108 grams of solids was collected when the cyclone was operating in rope discharge. A sample of the overflow containing approximately 29 grams of solids was collected 6 minutes later after the cyclone had changed to fan discharge. No changes in flow rate or feed slurry composition had occurred to change to fan discharge, but the diatomite had aged so that making rope discharge could not be maintained. The particle size distribution of the underflow and overflow are in Tables I and II.

TABLE I

| Mesh | (underflow) Wt. % | |
|---|---|---|
| 10 | 9.82 | Average particle size was 15.3 mesh |
| 20 | 49.84 | |
| 40 | 25.02 | |
| 100 | 12.51 | |
| 400 | 2.51 | |
| smaller | 0.31 | |

TABLE II

| Diameter (μm)* | (overflow) Wt. % | |
|---|---|---|
| 1.0 | 2.3 | Average particle size was 6.3 μm |
| 1.5 | 1.2 | |
| 2.0 | 3.2 | |
| 3.0 | 8.4 | |
| 4.0 | 10.6 | |
| 6.0 | 21.2 | |
| 8.0 | 15.6 | |
| 12.0 | 17.9 | |
| 16.0 | 8.4 | |
| 24.0 | 6.8 | |
| 32.0 | 2.0 | |
| 48.0 | 0.0 | |
| 64.0 | 2.4 | |

*38 μm equals 400 mesh

The underflow was separated from the heptane, slurried with an equal weight of THF and filtered through #40 Wattman paper using 20 inches mercury vacuum pressure. The resulting filter cake had a depth of about 1½ to about 2 inches. The overflow was then filtered with 20 inches mercury vacuum pressure through the cake. The filtration rate was 4.0 lb. solids/hr/ft² of filter face. Heptane was evaporated from the overflow filtrate and the resulting bitumen contained 0.71 wt.% ash content (the ash content corresponds to the fines content.)

As seen from the example, by splitting in a hydrocyclone a bitumen, organic solvent and spent diatomite solution into two streams comprising coarser diatomite having an average particle size of about 15 mesh in one stream and finer diatomite in the second stream, producing a filter cake from the first stream and then filtering the second stream through the filter cake, a bitumen solvent filtrate of much lower fines content can be produced. The bitumen extract separated from such a filtrate is thus of low fines content and can be processed directly in a refinery with decreased risk of plugging a catalyst bed. The example also shows that acceptable filtration rates through a spent diatomite cake can be achieved, thereby permitting a continuous extraction method.

The above discussion is intended to be merely illustrative, and the full scope of the invention is given by the following claims.

We claim:

1. A method for filtering spent tar sands from a solution of bitumen, spent tar sands and solvent comprising:
    (a) separating a solution of bitumen, spent tar sands, and organic solvent into a first stream comprising coarser spent tar sands having an average particle size of about 10 to about 100 mesh, bitumen and solvent, and a second stream comprising finer spent tar sands, bitumen and solvent;
    (b) producing a filter cake by filtering the coarser spent tar sands from the first stream; and (c) filtering the finer spent tar sands from the second stream with the filter cake, wherein steps (a), (b), and (c) are repeated so that the filter cake produced in step (b) is continuously replaced.

2. The method of claim 1 further comprising washing the filter cake and filtered finer spent tar sands with solvent.

3. The method of claim 1 wherein the spent tar sands in the solution comprise at least about 15 wt% of spent tar sands smaller than 400 mesh.

4. The method of claim 1 wherein the solution is derived from solvent extraction of bitumen containing diatomite.

5. The method of claim 1 further comprising removing coarse spent tar sand larger than 10 mesh from the solution of spent tar sand, bitumen and organic solvent before separating the solution into the two streams.

6. The method of claim 1 wherein the separation into two streams is performed in a hydrocyclone.

7. The method of claim 6 wherein spent tar sands content in the solution of bitumen, spent tar sands and organic solvent is greater than about 50%.

8. The method of claim 5 wherein the filter cake contains less than about 5 weight % fines.

9. A method for filtering spent diatomite from a solution of bitumen, spent diatomite and organic solvent comprising:
   (a) separating a solution of bitumen, spent diatomite and organic solvent into a first stream comprising coarser spent diatomite having an average particle size of about 10 to about 100 mesh, bitumen and solvent, and a second stream comprising finer spent diatomite, bitumen and solvent;
   (b) producing a filter cake by filtering the coarser spent diatomite from the first stream;
   (c) filtering the finer spent diatomite from the second stream with the filter cake; and
   (d) combining the filtered first and second streams to produce a combined stream.

10. The method of claim 9 further comprising removing coarse spent diatomite larger than 10 mesh before separating the solution into the two streams.

11. The method of claim 9 wherein the separating in step (a) is performed in a hydrocyclone.

12. The method of claim 9 wherein the filter cake has a depth of about 1 to about 2 inches.

13. A method for the extraction of bitumen from bitumen containing diatomite comprising:
   (a) contacting bitumen containing diatomite with an organic solvent;
   (b) separating a solution of bitumen, spent diatomite and solvent into a first stream comprising coarser spent diatomite, bitumen and solvent, and a second stream comprising finer spent diatomite bitumen and solvent;
   (c) filtering the coarser spent diatomite from the first stream to produce a filter cake;
   (d) filtering the finer spent diatomite from the second stream with the filter cake;
   (e) combining the filtered first and second streams to produce a combined stream; and
   (f) separating bitumen from the combined stream, wherein steps (a), (b) and (c) are repeated so that the filter cake produced in step (b) is continuously replaced.

14. The method of claim 13 wherein the filter cake comprises particles with an average particle size of about 10 to about 100 mesh.

15. The method of claim 13 further comprising, before separating the solution to two streams, separating diatomite larger than 10 mesh from the solution.

16. The method of claim 14 wherein the filter cake contains less than about 5 weight percent fines.

17. The method of claim 13 wherein the organic solvent is a paraffin of carbon number 5-9.

18. The method of claim 17 wherein the paraffin is heptane.

19. The method of claim 13 wherein the filtering is done on a vacuum belt filter operating at less than 25 inches of mercury pressure.

20. A method for filtering spent tar sand from a solution of bitumen, spent tar sand and solvent comprising:
   (a) separating a solution of bitumen, spent tar sands and solvent into a first stream comprising coarser spent tar sands having an average particle size of about 10 to about 100 mesh, bitumen and solvent, and a second stream comprising finer spent tar sands, bitumen and solvent;
   (b) filtering on a belt filter the coarser spent tar sands from the first stream to produce a filter cake having a depth sufficient to prevent blinding of the belt filter; and
   (c) filtering the finer spent tar sands from the second stream with the filter cake.

* * * * *